United States Patent [19]

Greenhead et al.

[11] 4,299,322
[45] Nov. 10, 1981

[54] CIGARETTE CONVEYOR SYSTEM

[75] Inventors: David L. Greenhead; Frank Heybourn, both of Deptford, England

[73] Assignee: Molins Limited, London, England

[21] Appl. No.: 95,518

[22] Filed: Nov. 19, 1979

[30] Foreign Application Priority Data

Nov. 17, 1978 [GB] United Kingdom ............... 44925/78

[51] Int. Cl.³ .............................................. B65G 1/00
[52] U.S. Cl. ..................................... 198/347; 198/778
[58] Field of Search ............. 198/347, 778; 89/33 BB, 89/33 BC, 33 C, 34

[56] References Cited

U.S. PATENT DOCUMENTS 1,226,592  5/1917  Privett ................................. 198/778
3,590,684  7/1971  Gilbert ..................................... 89/34
3,865,227  2/1975  Kaak ..................................... 198/778
4,030,595  6/1977  McCombie ........................... 198/778

FOREIGN PATENT DOCUMENTS 856234  6/1940  France ............................ 89/33 BC
9455  of 1888  United Kingdom ............ 89/33 BC Primary Examiner—Joseph E. Valenza
Attorney, Agent, or Firm—Craig and Antonelli

[57] ABSTRACT

A reservoir for use in a conveyor system for cigarettes or similar rod-like articles comprises a laterally flexible conveyor (12) and a number of curved guide members (preferably wheels 14 to 17) having at least two different diameters and arranged to guide the conveyor along a spiral path, in a substantially constant plane, including a loop or partial loop lying within a wider loop or partial loop.

5 Claims, 2 Drawing Figures

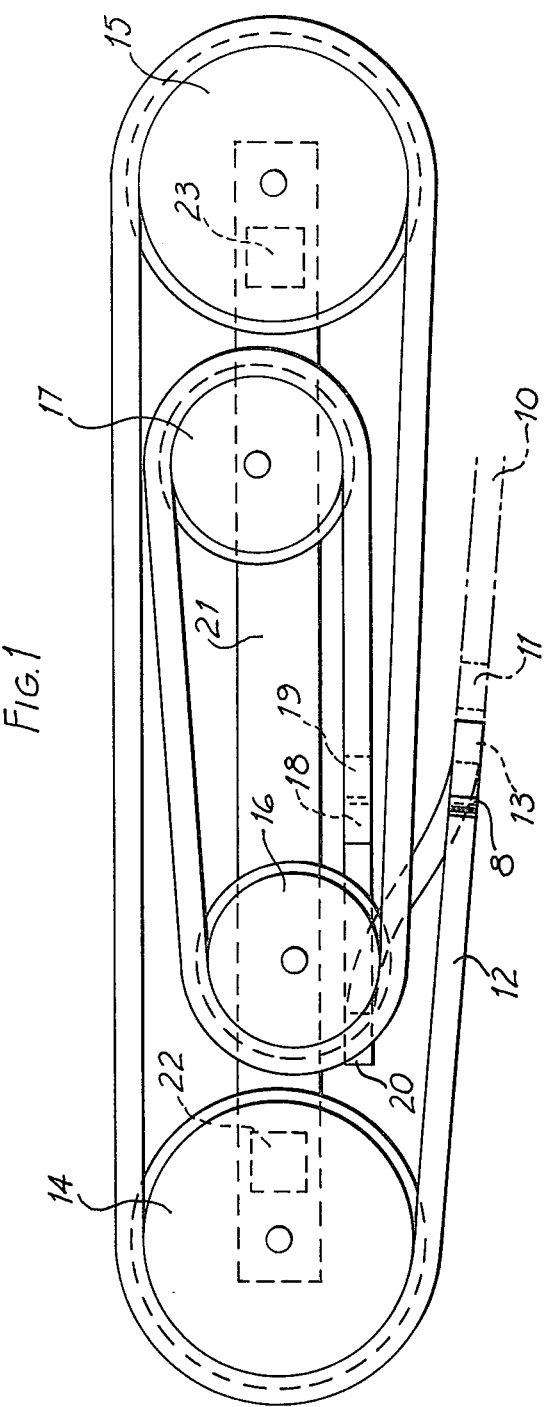

CIGARETTE CONVEYOR SYSTEM

This invention is concerned particularly with a conveyor system for conveying cigarettes from a cigarette making machine to a cigarette packing machine. However, the system is also applicable to the conveyance of similar rod-like articles such as cigarette filter rods, but the invention will for convenience be described only in terms of cigarettes.

Our British patent specification No. 1,299,175 describes in particular a conveyor system including a variable-capacity reservoir comprising a laterally flexible reversible conveyor which serves as a floor of the reservoir and extends along a path including at least one lateral bend about a substantially vertical axis and is arranged to receive an article stack of variable length. More specifically that specification describes an arrangement in which the reservoir conveyor extends along a substantially helical path comprising a number of turns at different levels. Such a reservoir has been marketed by Molins Limited and is known as the Molins OSCAR.

Compared with previous proposals, the Molins OSCAR had the advantage that the reservoir could accomodate a substantial number of cigarettes without needing a stack height (of the cigarettes in the reservoir) such as to apply excessive pressure to the cigarettes at the bottom of the stack. In other words, a very long stack can be accomodated along the helical path of the OSCAR; the stack can be relatively thin, e.g. no more than about 10 cm thick.

The present invention is concerned with retaining the thin stack of the OSCAR, but in a simpler general configuration.

According to the present invention, a reservoir for use in a conveyor system for cigarettes or similar rod-like articles comprises a laterally flexible conveyor and a number of curved guide members (preferably wheels) having at least two different diameters and arranged to guide the conveyor along a spiral path, in a substantially constant plane, including a loop or partial loop lying within a wider loop or partial loop.

The wider loop is formed where the conveyor passes around the larger diameter guide or guides, and the narrower loop is formed where the conveyor passes around the smaller diameter guide or guides.

This arrangement is simpler and less expensive than the OSCAR since all the wheels or other guides can be mounted more simply. The OSCAR arrangement lends itself to the provision of a larger cigarette capacity since the reservoir conveyor can more easily be made relatively long, but a reservoir according to the present invention is an attractive alternative where the large cigarette capacity of OSCAR is not needed.

Preferably, the arrangement is such that the cigarettes, on passing into the reservoir, move along the wider loop before reaching the narrower loop.

An example of a reservoir according to this invention is shown in the accompanying drawings. In these drawings:

FIG. 1 is a plan view of the reservoir, and
FIG. 2 is a side elevation of the reservoir.

Cigarettes 9 are fed into the reservoir in stack formation, e.g. in the same manner as in the above-mentioned patent specification, by a conveyor 10 (corresponding to conveyor 625 in the patent specification) which returns around a pulley 11. The reservoir itself includes a laterally flexible conveyor 12 which is basically as described with reference to FIGS. 12 to 17 of the above patent specification; that is to say, it includes a flexible zig-zag member carried by a chain. A movable end wall 8 on the conveyor defines the end of the stack of cigarettes in the reservoir.

The path of the reservoir conveyor 12 extends around a pulley 13 adjacent to the pulley 11, around large-diameter wheels 14 and 15, around smaller diameter wheels 16 and 17, around pulleys 18 and 19 and finally around a pulley 20. The pulley 20 is in the form of a sprocket engaging the chain of the conveyor, and the whole conveyor may be driven by this sprocket, the remaining pulleys and the wheels 14 to 17 being arranged to idle. Alternatively, one or more of the wheels 14 to 17 may be driven so as to drive the conveyor 12 by frictional engagement as in the OSCAR.

It will be seen that the path of the conveyor 12 around the larger diameter wheels 14 and 15 forms a relatively wide loop within which lies a narrower loop extending around the wheels 16 and 17. In order to pass below the wheel 16, the conveyor 12 moves downwards around the pulley 18 and then returns around the pulley 19, which may be adjustable in position relative to the pulley 18 so as to tension the conveyor.

All four wheels 14 to 17 are mounted in a common horizontal plane on a simple girder 21 which is carried overhead by two pillars 22 and 23.

As described in the above patent specification, the reservoir conveyor 12 (and also the feeder conveyor 10) may be reversibly driven under the control of a sensor at a junction zone into which cigarettes are delivered from a cigarette making machine (or more than one machine) and from which cigarettes pass to one or more packing machines. Further details from the above patent specification and/or from the OSCAR design may be used in connection with the present invention.

The following control system may be used with a reservoir according to this invention (or with any other form of reservoir) but forms no part of the present invention. The reservoir includes means for indicating the condition of the reservoir (e.g. as used in OSCAR or as described in our British Pat. No. 1,519,777 or patent application No. 23553/77), i.e. how full the reservoir is; and the associated cigarette making or packing machine (or machines) may be slowed down automatically from time to time so as to tend to keep the reservoir approximately half full. There is preferably a "neutral zone" around the half-full state of the reservoir in which the making and packing machines are allowed to operate at full speed (their cigarette capacities at that stage being preferably matched); when the state of the reservoir moves out of the "neutral zone", the making or packing machine is automatically slowed down so as to tend to feed more cigarettes into or from the reservoir as the case may be. The percentage by which the maker or packer is slowed down may be arranged to increase as the reservoir approaches the full state (in the case of the maker) or the empty state (in the case of the packer).

An inwardly spiralling conveyor as described in this specification may also, in principle, be used as a delay line to allow drying time for cigarette filter rods, e.g. as described in our British Patent Specification No. 1,389,447.

We claim:

1. A reservoir for use in a conveyor system for cigarettes or similar rod-like articles, comprising a conveyor having a conveying surface which is flexible about an axis generally transverse to said surface, and a number of guide members having substantially parallel axes and at least two of said guide members having different diameters, said guide members being arranged to guide the conveyor along a spiral path with said conveying surface lying in a substantially-constant plane which is substantially perpendicular to said axis, said path including a loop or partial loop lying within a wider loop or partial loop and means for reversibly driving said conveyor.

2. A reservoir according to claim 1 in which at least one of the guide members is in the form of a wheel.

3. A reservoir according to claim 1 or claim 2 further including means for introducing the cigarettes into the reservoir along the wider loop where they move before reaching the narrower loop.

4. A reservoir according to claim 3 in which said guide members include first and second large-diameter wheels and third and fourth small-diameter wheels, and wherein the path of the cigarettes passing into the reservoir extends linearly towards the first large-diameter wheel, approximately 180° around said first wheel, linearly towards the second large-diameter wheel, approximately 180° around the said second wheel, linearly towards the third, small-diameter wheel, approximately 180° around the said third wheel, linearly towards the fourth, small-diameter wheel and around the said fourth wheel.

5. A reservoir according to claim 4 in which the path of the cigarettes extends approximately 180° around the fourth wheel and then extends linearly back towards the third wheel before passing around pulleys to return to the starting point.

* * * * *